United States Patent [19]

Zelenka

[11] Patent Number: 4,736,099

[45] Date of Patent: Apr. 5, 1988

[54] SCAN DEVICE WITH LIGHT MIXER AND DIFFUSING MEANS FOR HALF-TONE TRANSPARENCY ORIGINALS

[75] Inventor: Thomas Zelenka, Kiel, Fed. Rep. of Germany

[73] Assignee: Dr. Ing. Rudolf Hell GmbH, Fed. Rep. of Germany

[21] Appl. No.: 908,820

[22] Filed: Sep. 18, 1986

[30] Foreign Application Priority Data

Sep. 20, 1985 [DE] Fed. Rep. of Germany ....... 3533590

[51] Int. Cl.⁴ .......................... H01J 5/16; H01J 40/14; G01N 21/00
[52] U.S. Cl. ..................................... 250/227; 356/444
[58] Field of Search ....................... 356/443, 444, 431; 250/571, 572, 227

[56] References Cited

U.S. PATENT DOCUMENTS

| 4,260,899 | 4/1981 | Baker | 356/431 |
| 4,265,545 | 5/1981 | Slaker | 250/572 |
| 4,277,178 | 7/1981 | Cushing et al. | 250/571 |
| 4,367,047 | 1/1983 | Ikin | 250/572 |

FOREIGN PATENT DOCUMENTS 0214353 10/1985 Japan .................................. 356/444

*Primary Examiner*—David C. Nelms
*Assistant Examiner*—Michael Messinger

[57] ABSTRACT

An apparatus for scanning a transparency image original wherein scattered light emerging from the original is guided through lens or diffraction gratings onto a diffusion screen attached to a light mixer. In the light mixer, the light is mixed by multiple reflection and, at a light exit of the mixer, is guided to a cross-sectional transducer formed of a plurality of optical fibers. These fibers conduct the light onto a photoelectric transducer. The apparatus works with high efficiency and reduces an image falsifying influence of the Callier effect to such a degree that it no longer has a disturbing appearance in reproduction.

10 Claims, 1 Drawing Sheet

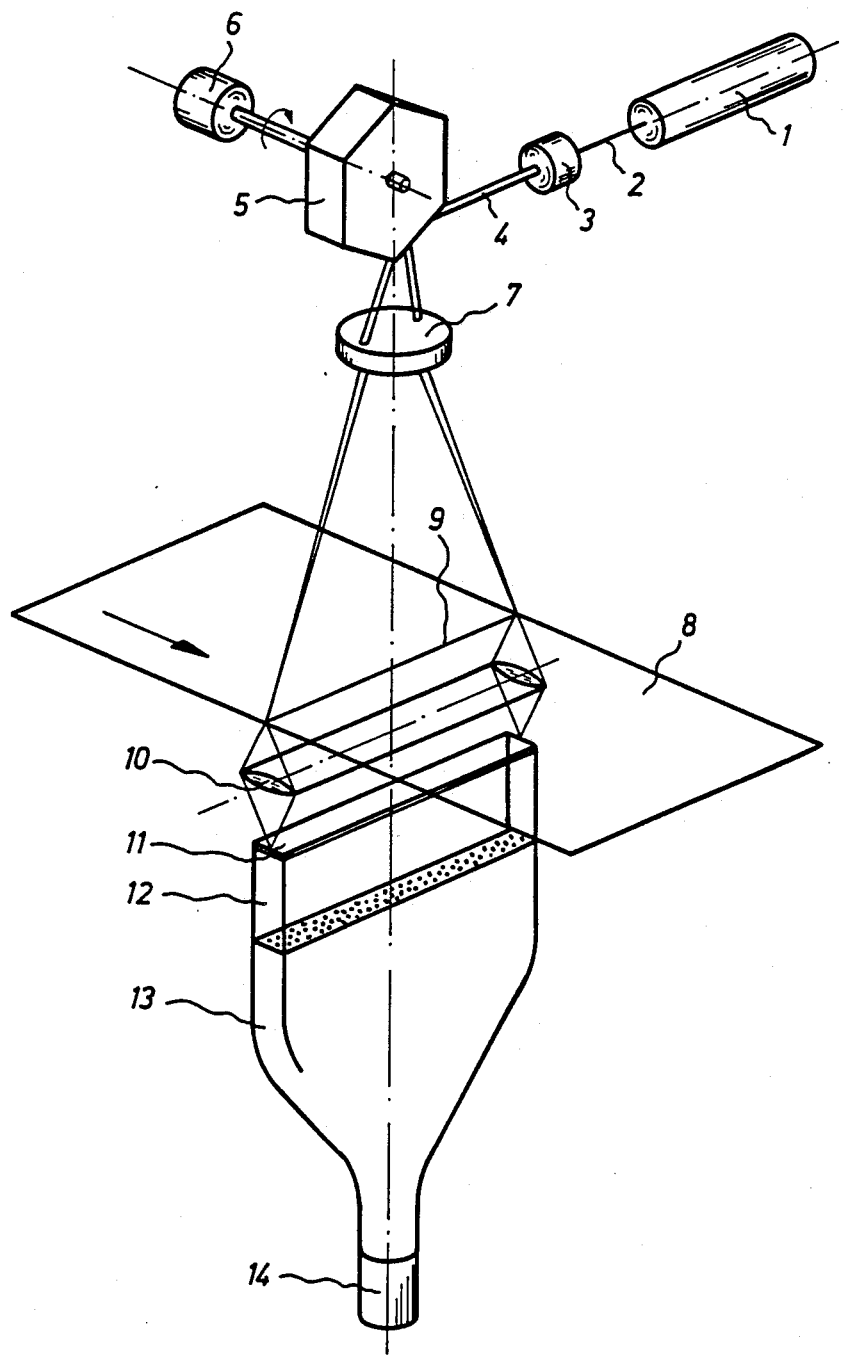

SCAN DEVICE WITH LIGHT MIXER AND DIFFUSING MEANS FOR HALF-TONE TRANSPARENCY ORIGINALS

BACKGROUND OF THE INVENTION

The invention relates to an apparatus for transparency scanning of continuous-tone or half-tone originals in electronic reproduction technology, preferably for flat bed scanners.

When, in tranparency scanning of an image original (usually a silver film), such an original is transilluminated with highly directional light, then after passage of the light, different measured values for the optical density result than would have derived if the original has been transilluminated by diffuse light. The values for highly directed light seem shifted toward high densities. This phenomenon known as the Callier effect arises due to light scatter at the silver grains in the photographic layer and essentially depends on their size and distribution.

In electronic reproduction technology, this effect appears in an image-falsifying way particularly when, in what are referred to as flat bed scanners, the planarly disposed original is scanned by a highly focused light ray moved transversely relative to the feed direction of the original (referred to as "flying spot scanning"). Lasers are employed as light sources in modern flat bed scanners. The narrow light ray of these lasers, after expansion, is guided onto a rotating polygonal mirror and, after correction of the errors which arise due to deflection by means of what is referred to as a scanner lens, is focused by this scanner lens in the plane of the original. As a result of the polygonal mirror, the beam executes a swinging motion over the original which is slowly advanced at right angles relative to the plane of swinging, so that this original is scanned line-by-line. The light which has passed through the original and whose intensity is dependent on the optical density of the image point respectively impinged by the light ray is supplied to a photoelectrical transducer in a suitable way along the scan line. This transducer converts the optical density values of the original into serial, electrical signals.

Without further techniques, the density values in this type of scanning would be falsified by the afore-mentioned Callier effect, and this would have a disturbing appearance in the re-recording.

U.S. Pat. No. 4,453,180 discloses a light pick-up device for transparency scanning wherein an inwardly partially mirrored, partially diffusely reflecting tube is attached below the original parallel to the scan line. This tube has a longitudinal slot parallel to the scan line through which the light transilluminating the original enters. The end faces of a cross-sectional transducer formed of a plurality of optical fibers are arranged offset at a right angle relative to the light entry axis.

Apart from the extraordinary low efficiency, the disadvantage of this apparatus is that the mount for the original to be scanned is always formed of a glass plate which must have a considerable thickness for stability reasons. The light entry slot is at a distance from the original which amounts to at least this glass thickness. On the other hand, the light entry slot must be narrow as possible so that the arrangement can function with reasonable efficiency. What results therefrom is that the entry aperture for the scatter lobe is so greatly constricted that the disturbing influence of the Callier effect can only be imperfectly influenced therewith.

Even given moderate densities, the aperture angle of the scatter lobe of the light emerging from the original is significantly greater than the entry angle into the tube limited by the edges of the slot. The light scatter covered by the slot edges can thus not contribute to the measurement.

SUMMARY OF THE INVENTION

An object of the present invention is to specifiy a transparency scanning, preferably for flat bed scanners, which eliminates the influence of the Callier effect, or at least diminished it to such a degree that it is no longer disturbing. According to the invention, light passing through the original is guided through at least on lens onto a diffusing means such as a diffusing screen which forms an entry face of a substantially cuboid light mixer comprising transparent material. A cross-sectional transducer is provided having an entry end and an exit end, and which is formed of a plurality of individual optic fibers. The entry end of the cross-sectional transducer is arranged at an exit face of the cuboid light mixer and a geometrical shape of the cross-sectional transducer at its entry end corresponding to a shape of a light exit face of the light mixer. The other end of the cross-sectional transducer is adjacent a photoelectric transducer and has a shape of a sensitive layer of the photoelectric transducer.

BRIEF DESCRIPTION OF THE DRAWING

The drawing FIGURE schematically shows an optical arrangement according to the invention.

DESCRIPTION OF THE PREFERRED EMBODIMENTS

A light ray 2 emitted by a laser 1 is expanded via an afocal optics 3 to form a parallel light bundl 4. This is incident onto a rotating polygonal mirror 5 which is placed in rotation by a motor 6. The polygonal mirror deflects the bundle through what is referred to as a "scanner lens" 7 which effects a small f- $\theta$- compensation, i.e. it compensates the tangent error. The influence of the differing angular velocity simultaneously insures that the focussing of the bundle is maintained over the full, straight scan line 9 of the planar transparency original 8. Via a mechanism not shown here, the transparency original to be scanned is moved slowly in the direction of the arrow and is thus scanned line-by-line.

Due to the Callier effect, the relatively greatly directed, entering light departs the original at the underside thereof as a more or less widely expanded lobe. As described above, the scattering occurs at the silver grains of the layer and depends on their size and distribution. The cylindrical lens 10 arranged under the scan line 9 focusses the light onto a diffusing screen 11. When no scatter is present (original is not blackened, density equals 0), then only a small focus point is imaged on the diffusion screen. Given greater optical density, i.e. greater scattering, by contrast, the focus spot will assume the shape of a more or less oblong ellipse whose major axis lies parallel to the scan line 9. The diffusing screen 11 forms the front face of what is referred to as a light mixer 12 which is formed of a cuboid member of light-transmissive material—for instance glass or plexiglass—and whose outside faces are polished. The greatly scattered light emerging from the diffusing screen 11 is conducted in this member to the underside thereof via multiple reflections. This underside is thus illuminated in large-surface fashion largely independently of the shape of the focus spot on the diffusion film. The influence of the Callier effect is thus eliminated, or is at least greatly reduced so that it no longer appears in a disturbing fashion in practice. The light emerges from the underside of the light mixer 12 and enters into a cross-sectional transducer 13 formed of a plurality of unordered optical fibers. At the light mixer 12, the bundle has the shape of the underside of the light mixer 12 and is combined at the other end to form a cross-section which essentially corresponds to the form of the sensitive layer of the photo-electric transducer 14. This supplied electrical output signals which, due to the arrangement of the invention, are largely rid of the influence of the Callier effect.

Although various minor changes and modifications might be proposed by those skilled in the art, it will be understood that I wish to include within the claims of the patent warranted hereon all such changes and modifications as reasonably come within my contribution to the art.

I claim as my invention:

1. An apparatus for elimination of the Callier effect when scanning a planarly lying transparency original wherein a light ray generated by a laser is led along a given direction over the original, the original being moved at right angles relative to the scanning direction, and wherein the scanning occurs line-by-line by use of a rotating polygonal mirror, comprising:
   lens means for guiding the light passing through the original onto a diffusing means which forms a layer at an entry face of a substantially cuboid light mixer comprisng transparent material, said light mixer also having an exit face spaced from the entry face at an opposite end of the cuboid light mixer;
   a cross-sectional transducer having an entry end and an exit end, and which is formed of a plurality of individual optic fibers, the entry end of the cross-sectional transducer being arranged adjacent said exit face of said cuboid light mixer;
   a photolectric transducer arranged adjcent the exit end of the cross-sectional transducer; and
   a geometrical shape of said cross-sectional transducer at said entry end corresponding to a shape of the light exit face of the light mixer, and the exit end thereof corresponding to a shape of a sensitive layer of the photolectric transducer.

2. an apparatus according to claim 1 wherein the lens means comprises a cylindrical lens means for bundling a light lobe emerging from the transparency original.

3. An apparatus according to claim 1 wherein the lens means comprises a Fresnel lens means for bundling a light lobe emerging from the transparency original.

4. An apparatus according to claim 1 wherein the lens means comprises a holographic lens means for bundling a light lobe emerging from the transparency original.

5. An apparatus according to claim 1 wherein the diffusing means comprises a diffusing screen.

6. An apparatus according to claim 1 wherein the light mixer has outside faces, at least one of which is mirrored.

7. An apparatus according to claim 1 wherein the light mixer has outside faces, at least one of which is mirrored.

8. An apparatus for scanning a planarly lying transparency original moving in a first direction and wherein the Callier effect is substantially eliminated, comprising:
   means for periodically delfecting a laser light beam across a width of the planarly lying transparency original and in a direction perpendicular to a moving direction of the transparency;
   a substantially cuboid light mixer means comprising transparent material and having directly adjacent an entry face a layer-like diffusing means, said light mixer means in combination with the diffusing means substantially negating the Callier effect caused by the transparency original;
   lens means for guiding light passing through the transparency original into the diffusing means;
   a cross-sectional transducer formed of a plurality of individual optic fibers and having a geometrical configuration at an entry end which corresponds to a geometrical configuration of an exit face of the light mixer means, said exit face being directly adjacent said cross-sectional transducer entry end; and
   an exit end of the cross-sectional transducer having a geometrical shape corresponding to a shape of a light receiving surface of a photoelectric transducer which is adjacent thereto.

9. An apparatus according to claim 8 wherein the diffusing means comprises a diffusing screen and the lens means comprises a cylindrical lens.

10. An image original scanning system, comprising:
   a continuous-tone or half-tone electronic reproduction technology transparency original having silver grains therein in a photographic layer thereof which causes a Callier effect due to light scatter at the silver grains thereof when scanned with a highly focused light ray;
   means for providing a highly focused light ray to scan the photographic layer along a scan line thereon;
   lens means at a side of the photographic layer opposite the scanning means for focusing light received from a received scanning line;
   a substantially cuboid-shaped light mixer means including at an entry face a diffusion layer, said light mixer means also having an exit face at an opposite end thereof, and said light mixer means substantially negating the Callier effect wherein light transmitted at the exit face is substantially independent of a focused spot in size or dimension at the diffusion layer; and
   a plurality of light optics forming a bundle which at an entry face has a dimension substantially corresponding to the exit face of the cuboid light mixer means and at an exit end has a dimensional extent substantially corresponding to a light detector thereat.

* * * * *